United States Patent Office 3,484,426
Patented Dec. 16, 1969

3,484,426
SUSPENSOID COMPOSITION
Robert W. Stachowiak, Sr., and Everett W. Campbell, Akron, Ohio, assignors to The Goodyear Tire & Rubber Company, Akron, Ohio, a corporation of Ohio
No Drawing. Continuation of application Ser. No. 374,822, June 12, 1964. This application Mar. 28, 1968, Ser. No. 717,050
Int. Cl. C08d 1/12; B01j 11/00
U.S. Cl. 260—94.3
9 Claims

ABSTRACT OF THE DISCLOSURE

A process of preparing a suspension of a transition metal salt in a semi-solid hydrocarbon and the use thereof for the polymerization of olefins.

---

This application is a continuation of Ser. No. 374,822 filed June 12, 1964, now abandoned.

This invention relates to a new composition of matter. More particularly it relates to a semi-solid composition comprising transition metal compounds suspended in semi-solid hydrocarbons.

Certain components which are useful in stereo specific polymerizations are of a solid nature, such as titanium tetraiodide, titanium trichloride, cobaltous chloride and vanadium trichloride. Previously, such compounds were introduced to the polymerization vessel by forming a slurry in light, inert liquid solvent which most often was the reaction diluent. This procedure had several disadvantages. The solids in the slurry tend to settle, thus providing high local concentrations of the component with the resulting shift in catalyst concentration at the point of settling. This settling effect also makes proper metering extremely difficult. Further, many of these solid components before suspension are highly susceptible to deterioration when exposed to air or moisture.

It is, therefore, an object of this invention to provide a composition that prohibits the settling of certain catalyst components, thus giving a more homogeneous system and simplifying metering of the components. It is a further object to provide a composition protected from contaminating factors such as air and water during handling, packaging, transportation and use.

These and other objects, which will become apparent as the description of this invention proceeds, are accomplished by forming a new and useful composition of matter comprising a suspensoid of (a) a viscous hydrocarbon and (b) a solid transition metal compound.

It has been found that the novel compositions of this invention may be prepared in a variety of ways. Procedures which have been found to be satisfatcory may be outlined broadly as follows: A moisture-free, oxygen hydrocarbon which has the property of existing in a semi-solid state over a broad temperature range may be heated to a molten state. The transition metal salt may then be added and the mixture agitated to provide a uniform blend. As an alternative method a slurry of the transition metal salt in a light inert hydrocarbon such as pentane or benzene may be obtained and mixed with the semi-solid hydrocarbon in either its semi-solid or molten state. The light hydrocarbon solvent may then be removed by some convenient distillation means. If light inert solvents that form an azeotrope with impurities are selected, this method has obvious advantages. Either of these procedures will be followed by cooling the composition to its semi-solid to solid state which will be a stable suspensoid.

The solid transition metal compounds which are employed in the practice of this invention may generally be obtained from commercial sources or prepared by methods known to those skilled in the art.

It is a particular advantage of this invention that these materials may be obtained from the commercial sources in a larger particle size than could be usefully employed heretofore with attendant economic advantage.

Representative of but not limiting such solid compounds are titanium tetraiodide, titanium trichloride, cobalt chloride, nickel chloride, and vanadium trichloride. The content of these substances in the composition is variable and may range as high as 75% by weight and it will be appreciated that these compounds will be employed in this composition as a particulate mass. Most often the particle size will be that available from commercial sources and generally ranges from 200 to 80 mesh. While this size range is suitable for most purposes, other sizes may be usefully employed and those practicing this invention will choose a weight percent and particle size which most closely approaches their needs.

The semi-solid hydrocarbon referred to may be selected from the group consisting of petroleums, paraffin waxes, and extremely heavy petroleum oils. These substances must have the property of existing in said semi-solid state under deployment conditions, though they may be a rigid solid at room temperature. The paraffin waxes advantageously utilized are those that have melting points in the approximate range of 35° C. to 95° C. These are well known compounds and available from commercial sources. However, it should be pointed out that the success of various stereospecific polymerization processes depends on the purity of the overall system. Therefore, it may be necessary to select and purify the viscous hydrocarbon with a view to the requirements of final use.

Where the final use is to be a stereospecific polymerization the viscous hydrocarbon should be substantially free of polar fractions, have good color, not be acidic, be substantially free of acetylides, and be low in water and oxygen content and certain nitrogen compounds. The second procedure outlined above is particularly useful in reducing the water and oxygen content when a light, inert hydrocarbon solvent is selected that forms an azeotrope with water such as the benzene or pentane mentioned. Of the viscous hydrocarbons listed, petrolatum has been found to be particularly suitable.

Each step in the process of this invention should be carried out in an inert environment. That is to say, an environment which does not react with the viscous hydrocarbon, or the transition metal compound, and which will not dissolve in the suspension to the detriment of the end use process. Many such environments will occur to those skilled in the art, but a gas such as dry nitrogen or argon will often be found to be acceptable and most convenient.

Since the discovery of the stereospecific polymerization of olefins several competing systems have been set forth and many variations of each has been disclosed. The techniques of these polymerizations are now available to those skilled in the art through both the technical and patent literature. It is not the object of this disclosure to go over that art again. It is an object of this invention, and the disclosure thereof, to provide an improved process for the stereospecific polymerization of olefins. This object is accomplished in a process of polymerization wherein an olefin is polymerized in a light, inert hydrocarbon solution in the presence of a solid transition metal compound the improvement which comprises suspending said transition metal compound in a viscous hydrocarbon which is soluble in said light, inert hydrocarbon.

It will be observed that this improvement is limited to processes employing solution polymerization techniques, and as such is particularly suitable for the polymerization of the diolefins isoprene and butadiene according to current commercial practices.

The following examples are illustrative of suitable procedures for the preparation of the novel compositions of the present invention. It will be understood that various changes may be made with reference to the selection of inert hydrocarbons, proportions of ingredients and various details of procedure without in any way departing from the principals of this invention. Examples are given only by way of illustration.

EXAMPLE I

Petrolatum slurry of $TiI_4$ (molten petrollatum method)

*Preparation 1.*—A sample petrolatum (105.4 g.) was melted on a hot plate and heated to a temperature in excess of 100° C. A dry nitrogen atmosphere was maintained over the surface of the molten petrolatum. $TiI_4$ (32.2 g.) of 100 mesh size was added to the jar of molten petrolatum. A laboratory stirrer was immersed in the mixture to provide agitation sufficient to maintain the $TiI_4$ in suspension until thickening began. The agitator was removed from the partially solidified material, the jar capped and shaking was maintained until maximum viscosity was reached. On complete cooling (to room temperature), the jar was opened and the contents were exposed to the atmosphere. No fuming of the $TiI_4$ was noted to occur. A sample of the semi-solid spread on paper toweling maintained its deep color even when placed under water.

*Preparation 2.*—A sample petrolatum (200 g.) was added to a wide mouth jar. The whole was heated to a temperature of 120° C. on a hot plate for a period of one hour while passing a stream of dry nitrogen through the molten mass. Analysis of the petrolatum yielded a moisture analysis of less than 10 p.p.m. To the molten mass was added 59.0 g. of 100 mesh $TiI_4$. The highly fluid mass was subjected to vigorous shaking until maximum viscosity was achieved. Analysis of the petrolatum slurry yielded a result of 20.4 wt. percent $TiI_4$. No fuming of $TiI_4$ resulted on exposure of the slurry to air.

EXAMPLE II

Petrolatum slurry of $TiI_4$ (solvent removal method)

A sample of petrolatum was melted on a hot plate and maintained at a temperature of 120° C. for one hour while passing dry nitrogen through the melt. Analysis of the petrolatum yielded a result of less than 10 p.p.m. moisture. The petrolatum was then allowed to return to room temperature.

A quantity of 100 grams of this dried petrolatum was added to 200 grams of dry pentane solvent, the mass agitated to provide a thin petrolatum solution. To this solution, maintained under nitrogen, was added 21.3 g. of 100 mesh $TiI_4$. The $TiI_4$ was uniformly dispersed throughout the petrolatum by means of a spatula. The flask was attached to a vacuum source and solvent removed. A total of 155 g. of solvent was removed.

EXAMPLE III

The following experiments illustrate the successful use of the novel compositions of this invention as a polymerization catalyst component. Technique of such polymerizations are now well-known to those skilled in the art. Here, 10 grams of butadiene in 100 milliliters of solution in benzene was placed in each of several 4 oz. bottles employing conventional dry, air-free techniques. To these bottles were added varying amounts of triisobutyl aluminum and titanium tetraiodide. The triisobutyl aluminum was added as a 0.323 molar solution in benzene. Because it was difficult to add exact amounts of the titanium tetraiodide petrolatum suspension under experimental conditions a small amount of triisobutyl aluminum was first added to the bottles. Then the desired amount of titanium tetraiodide-petrolatum suspension was weighed in and finally an additional amount of triisobutyl aluminum was added based on the $TiI_4$ weight calculated to achieve the desired aluminum/titanium ratio. After the addition of the catalyst, these bottles were allowed to polymerize for one hour while being tumbled in a constant temperature bath of 50° C. At the end of this time polymerization was terminated, the polymer was coagulated and dilute solution viscosity was determined in a conventional manner. The microstructure of the polymer was obtained by conventional infrared techniques. The titanium tetraiodide petrolatum suspension used in these experiments were prepared according to Example I, Preparation 2.

The accompanying table shows the experiment number in column 1; the amount of titanium tetraiodide petrolatum suspension added in terms of parts by weight per 100 parts of monomer in column 2, and the aluminum/titanium mole ratio is shown in column 3. The percent yield, that is to say, the percent rubber recovered based on weight of monomer available is shown in column 4. Column 5 shows the dilute solution viscosity (DSV) which was obtained as an indication of the molecular weight of the polymer. Column 6 shows the percent gel or the amount of the recovered rubber which is insoluble after 0.5 gram of rubber was placed in 100 milliliter of benzene for 48 hours at room temperature. Column 7 shows the percent cis structure in the polymer.

TABLE

| 1 | 2 | 3 | 4 | 5 | 6 | 7 |
|---|---|---|---|---|---|---|
| Exp. No. | TTI phm. | Al/Ti | Yield, Percent | DSV | Gel, Percent | Cis (IR), Percent |
| 1 | 0.17 | 4.3 | 100 | 4.27 | 6.4 | 90.7 |
| 2 | 0.28 | 5.0 | 95 | 3.33 | 6.3 | 91.5 |
| 3 | 0.12 | 5.2 | 96 | 4.87 | 5.9 | |
| 4 | 0.12 | 5.9 | 100 | 4.24 | 5.1 | |
| 5 | 0.27 | 6.0 | 97 | 3.29 | 4.8 | |
| 6 | 0.18 | 6.2 | 100 | 4.22 | 4.5 | |
| 7 | 0.18 | 7.6 | 100 | 2.70 | 4.6 | |

While certain representative embodiments and details have been shown for the purpose of illustrating this invention, it will be apparent to those skilled in the art that various changes and modifications may be made therein without departing from the spirit or scope of the invention.

What is claimed is:

1. A process of preparing a suspension of a transition metal salt by obtaining a mixture of a transition metal salt, a light inert hydrocarbon, and a hydrocarbon having the property of existing in a semi-solid state through a broad temperature range, distilling away the said light inert hydrocarbon and any residual moisture and oxygen, and cooling the mixture to a semi-solid stable suspensoid.

2. The process according to claim 1 wherein said hydrocarbon having the property of existing in a semi-solid state is selected from the group consisting of petrolatums, paraffin waxes and heavy petroleum oils.

3. The process according to claim 2 wherein said hydrocarbon is petrolatum.

4. The process according to claim 1 wherein said solid transition metal salt is selected from the group consisting of titanium tetraiodide, titanium trichloride, cobalt chloride, nickel chloride and vanadium trichloride.

5. The process of claim 1 wherein the said hydrocarbon having the property of existing in a semi-solid state is petrolatum, the said light inert hydrocarbon is selected from the group consisting of benzene and pentane, and the said solid transition metal salt is titanium trichloride.

6. The process of claim 1 of preparing a composition comprising a suspension of a transition metal salt selected from the group consisting of titanium tetraiodide and titanium trichloride in petrolatum, where up to 75 percent by weight of the said composition is the transition metal salt, which comprises in an inert environment obtaining a mixture of the transition metal salt having a particle size of from about 200 to about 80 mesh size, a light inert hydrocarbon selected from the group consisting of pentane and benzene, and petrolatum, distilling away the light hydrocarbon and any residual moisture and oxygen, and cooling the mixture comprising the transition metal salt and petrolatum to a semi-solid stable suspensoid.

7. In a process for the polymerization of olefins wherein an olefin is polymerized in a light, inert hydrocarbon solution in the presence of a solid transition metal salt, the improvement which comprises adding said solid transition metal salt as a suspensoid where the suspensoid is prepared by obtaining a mixture of the transition metal salt, a light inert hydrocarbon, and a hydrocarbon having the property of existing in a semi-solid state through a broad temperature range, distilling away the said light inert hydrocarbon and any residual moisture and oxygen, and cooling the mixture to a semi-solid stable suspensoid.

8. The process according to claim 7 wherein the olefin is selected from the group consisting of isoprene and butadiene and wherein the said hydrocarbon having the property of existing in a semi-solid state is petrolatum, the said light inert hydrocarbon is selected from the group consisting of benzene and pentane, and the said solid transition metal salt is selected from the group consisting of titanium tetraiodide, titanium trichloride, cobalt chloride, nickel chloride and vanadium trichloride.

9. The process according to claim 7 wherein the olefin is selected from the group consisting of isoprene and butadiene, wherein the hydrocarbon having the property of existing in a semi-solid state is petrolatum, wherein the transition metal salt has a particle size of from about 200 to about 80 mesh and is selected from the group consisting of titanium tetraiodide and titanium trichloride and comprises up to 75 percent by weight of the said transition metal salt and petrolatum.

References Cited
UNITED STATES PATENTS 2,967,834  1/1961  Daniel et al. _____ 252—429
3,265,759  8/1966  Cain _____ 260—683.15

JOSEPH L. SCHOFER, Primary Examiner

R. A. GAITHER, Assistant Examiner

U.S. Cl. XR.
252—429